US012760815B1

(12) United States Patent
Zadikpor

(10) Patent No.: US 12,760,815 B1
(45) Date of Patent: Oct. 13, 2026

(54) ROTATABLE ATTACHMENT FOR BATHTUB FAUCET SAFETY

(71) Applicant: Mordechai Zadikpor, Karmiel (IL)

(72) Inventor: Mordechai Zadikpor, Karmiel (IL)

( * ) Notice: Subject to any disclaimer, the term of this patent is extended or adjusted under 35 U.S.C. 154(b) by 0 days.

(21) Appl. No.: 19/443,299

(22) Filed: Jan. 8, 2026

(51) Int. Cl.
*F16K 35/10* (2006.01)
*F16K 35/16* (2006.01)

(52) U.S. Cl.
CPC .............. *F16K 35/10* (2013.01); *F16K 35/16* (2013.01)

(58) Field of Classification Search
CPC ................................. F16K 35/10; F16K 35/16
See application file for complete search history.

(56) References Cited

U.S. PATENT DOCUMENTS

| | | | | |
|---|---|---|---|---|
| 1,823,891 | A | 9/1931 | Frankfort et al. | |
| 5,590,682 | A | 1/1997 | Fischer | |
| 5,664,447 | A * | 9/1997 | Neeley | E05B 13/101 70/178 |
| 5,950,982 | A | 9/1999 | Williams | |
| 8,276,876 | B2 | 10/2012 | Held et al. | |
| 9,657,866 | B1 | 5/2017 | Miskowic | |
| 2003/0226994 | A1 * | 12/2003 | Kawolics | B67D 3/043 251/231 |
| 2013/0233391 | A1 * | 9/2013 | McMillan | F16K 35/10 137/1 |

FOREIGN PATENT DOCUMENTS

| | | |
|---|---|---|
| CN | 112344055 | 2/2021 |
| CN | 219510174 | 8/2023 |
| CN | 220910546 | 5/2024 |
| CN | 221991080 U | 11/2024 |

OTHER PUBLICATIONS

Screen captures from Amazon entitled "Keep little ones from opening doors, levers or handles," 8 pages, uploaded on May 21, 2024 by Jokari USA. Retrieved from Internet: https://www.amazon.com/live/video/07d105cd1bcd4ed1bd869bace4b3ee3e?ref_=cm_sw_wa_r_ib_mb_VGxwgqtsJGse3.

* cited by examiner

*Primary Examiner* — P. Macade Nichols
(74) *Attorney, Agent, or Firm* — Shlomo Horowitz; Shlomo Horowitz Patents and Intellectual Property

(57) ABSTRACT

An attachment configured to be removably mounted over at least part of a faucet has: a generally circular first housing portion configured to surround at least part of the faucet lever and permits partial rotation of the lever in a first plane for a child, a connector portion, a second housing portion coupled to the connector portion. The first housing portion is rotatable relative to the second housing portion in a second plane. A projection on an interior surface of the first housing portion limits rotational movement of the lever in the first plane by physical interference. A locking pin within the second housing portion is movable between a locked position in which the first housing portion cannot rotate relative to the second housing portion, and an unlocked position. Actuation of the locking pin determines whether a projection limits lever rotation.

27 Claims, 7 Drawing Sheets

SECTION F-F

ROTATABLE ATTACHMENT FOR BATHTUB FAUCET SAFETY

FIELD OF THE INVENTION

The invention is in the field of bathtub safety devices to prevent children from accessing hot water, and in particular, such rotatable devices that attach to existing bathtub faucets, including retrofit devices, and in some implementations such devices that are controlled by a magnet.

BACKGROUND OF THE INVENTION

Many existing faucet lever limiters are integrally formed with, or require modification of, the existing faucet.

SUMMARY OF THE EMBODIMENTS

One embodiment is an attachment configured to be removably mounted over at least part of a faucet control lever and at least part of a central portion of a faucet to which the lever is integrally attached, comprising:

a generally circular first housing portion configured to surround at least part of the central portion of the faucet while providing a clearance that permits partial rotation of the lever in a first plane in a child user mode;

a connector portion extending from the first housing portion;

a second housing portion coupled to the connector portion and configured to be affixedly attached to external infrastructure, the first housing portion and the connector portion being rotatable together relative to the second housing portion in a second plane during use of the attachment;

a projection disposed on an interior surface of the first housing portion and configured to limit rotational movement of the lever in the first plane by physical interference;

a locking pin disposed within the second housing portion and movable between an unlocked position in which the first housing portion is free to rotate relative to the second housing portion in the second plane, and a locked position in which the first housing portion engages the faucet and is prevented from rotating relative to the second housing portion in the second plane; and a magnetic key configured to magnetically interact with the locking pin to move the locking pin from the locked position to the unlocked position without physical contact between the magnetic key and the locking pin.

wherein movement of the locking pin by the magnetic key selectively enables rotation of the first housing portion in the second plane, such that rotation of the first housing portion determines whether the projection of the first housing portion is operatively engaged to limit lever rotation in the first plane.

In some embodiments, the projection is formed as a circular flange, the projection being fixed in a default position and movable when released by an actuator situated on the first housing portion in an adult user mode to enlarge a permitted range of lever rotation. In some embodiments, a rotational movement of the projection as set by an adult user generates a new range of rotational movement of the lever so as to permit the adult user to select one of multiple ranges of hot-water and cold-water mixing positions.

In some embodiments, the magnetic key is positionable on an outer surface of the second housing portion so as to magnetically interact with the locking pin.

In some embodiments the projection is a curved flange extending inwardly toward the lever. In some embodiments, the projection is oriented generally parallel to the second plane and intersects the first plane to define a rotation-limiting surface. In some embodiments, the curved flange extends along only a portion of a perimeter of the first housing portion to selectively block lever rotation.

In some embodiments, the generally circular part of the first housing portion is configured to surround at least part of the central portion of the faucet without requiring mechanical fasteners. In some embodiments, the generally circular part of the first housing portion is connected to a biasing and indexing mechanism including one or more springs or ratchets.

In some embodiments, the projection is disposed on an interior perimeter of the first housing portion.

In some embodiments, the projection is adjustable to vary a permitted rotational range in the first plane between at least two distinct user-selectable limits.

In some embodiments, the attachment is a retrofit device configured for installation on an existing faucet without removal of faucet components and without requiring modification of the faucet.

In some embodiments, the attachment is configured to attach to a bathtub faucet or other faucet having a single lever control.

In some embodiments, the locking pin is inside the second housing portion and actuated by the magnetic key on an outer surface of the second housing portion.

In some embodiments, the locking pin is movable by use of the magnetic key from the locked position to the unlocked position in which the first housing portion is above the second housing portion and leaning toward a wall that the second housing portion is attached to.

In some embodiments, a structure of the attachment defines three different operational modes of lever rotation:

(a) when the lever can be rotated freely through a maximum range of motion because the first housing portion is positioned above the second housing portion and has not rotated toward the faucet;

(b) when the lever can be rotated but only through a manually pre-set range of motion defined by an indexed adjustment of the projection using an indexing mechanism inside the first housing portion after the first housing portion has been rotated into engagement with the faucet while the locking pin was unlocked and the locking pin was subsequently locked, and wherein, in the closed position of the attachment, release of the projection on the first housing portion by the actuator permits the projection to rotate within the pre-set range; and (c) when the lever is rotatable to a limited degree since the locking pin is locked after the first housing portion has been rotated so as to surround the at least part of the central portion of the faucet and since the projection on the first housing portion has not been released.

Another embodiment is a method of configuring a faucet-mounted attachment prior to installation on a faucet, the method comprising:

placing a projection that is on an interior surface of a first housing portion into a movable configuration relative to the first housing portion using an actuator on the first housing portion;

actuating a magnetic key to move a locking pin within a second housing portion from a locked position to an unlocked position; while the locking pin is in the unlocked position, rotating a first housing portion into engagement with a faucet lever;

shifting the projection into one of multiple selectable positions that define different permitted ranges of lever rotation in a first plane; and releasing the actuator to retain the projection in the selected position.

A further embodiment is an attachment configured to be removably mounted over at least part of a faucet control lever and at least part of a central portion of a faucet to which the lever is integrally attached, comprising: a generally circular first housing portion configured to surround at least part of the central portion of the faucet while providing a clearance that permits partial rotation of the lever in a first plane in a child user mode; a connector portion extending from the first housing portion;

a second housing portion coupled to the connector portion and configured to be affixedly attached to external infrastructure, the first housing portion and the connector portion being rotatable together relative to the second housing portion in a second plane during use of the attachment;

a projection disposed on an interior surface of the first housing portion and configured to limit rotational movement of the lever in the first plane by physical interference;

a locking tongue formed on a flexible outer surface of the second housing portion and selectively deflectable between a flexed condition, in which the first housing portion is free to rotate relative to the second housing portion in the second plane, and a straight condition, in which the first housing portion is prevented from rotating relative to the second housing portion in the second plane, the locking tongue is securely engaged in a recess of the connector portion, wherein deflection of the locking tongue selectively enables rotation of the first housing portion in the second plane, such that rotation of the first housing portion determines whether the projection of the first housing portion is operatively engaged to limit lever rotation in the first plane.

In some embodiments, the projection is formed as a circular flange, the projection being fixed in a default position and movable when released by an actuator situated on the first housing portion in an adult user mode to enlarge a permitted range of lever rotation.

In some embodiments, a rotational movement of the projection as set by an adult user generates a new range of rotational movement of the lever so as to permit the adult user to select one of multiple ranges of hot-water and cold-water mixing positions.

In some embodiments, the projection is a curved flange extending inwardly toward the lever. In some embodiments, the projection is oriented generally parallel to the second plane and intersects the first plane to define a rotation-limiting surface. In some embodiments, the curved flange extends along only a portion of a perimeter of the first housing portion to selectively block lever rotation.

In some embodiments, the generally circular part of the first housing portion is configured to surround at least part of the central portion of the faucet without requiring mechanical fasteners. In some embodiments, the generally circular part of the first housing portion is connected to a biasing and indexing mechanism including one or more springs or ratchets.

In some embodiments, the projection is disposed on an interior perimeter of the first housing portion.

In some embodiments, the projection is adjustable to vary a permitted rotational range in the first plane between at least two distinct user-selectable limits.

In some embodiments, the attachment is a retrofit device configured for installation on an existing faucet without removal of faucet components and without requiring modification of the faucet.

In some embodiments, the attachment is configured to attach to a bathtub faucet or other faucet having a single lever control.

BRIEF DESCRIPTION OF THE DRAWINGS

Various embodiments are herein described, by way of example only, with reference to the accompanying drawings, wherein.

DETAILED DESCRIPTION OF THE EMBODIMENTS

Figure 3:
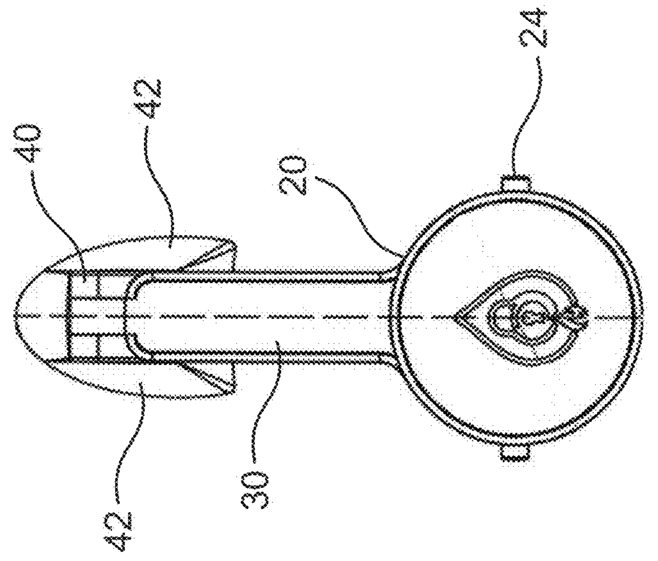
FIG. 3 is a front view of the child safety attachment of FIG. 2 in a closed position, in accordance with one embodiment.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Applicant has found that the existing safety devices require redesigning the faucet. This is not practical. Applicant has also found that existing devices are either for a child or for an adult and not an in-between mode that is suitable for an older child. Applicant has also found that in the course of adapting the faucet to be suitable for a child —that is by limiting the range of temperature that the faucet can be set to—it becomes less convenient for the adult when the adult wants to use the faucet. It is helpful to have an additional mode when the attachment is in the child mode, in which the attachment can be adjusted to expand the range of temperatures without having to reset the attachment to adult mode.

In some embodiments, the attachment herein is used in faucets of bathtubs that have a lever that rotates in either direction to make the water hotter or colder. It can be attached to an existing faucet without any redesign of the faucet.

In some embodiments, the attachment is configured to be removably mounted over a faucet control lever and a central portion of a faucet to which the lever is integrally attached. The attachment has a first housing portion configured to surround at least part of the central portion of the faucet while providing a clearance that permits partial rotation of the lever in a first plane in a child user mode.

A connector portion extending from the first housing portion, a second housing portion coupled to the connector portion. The first housing portion is rotatable relative to the second housing portion in the second plane during use of the attachment.

As used herein, rotation of the first housing portion in a 'second plane' denotes relative movement (for example arcuate movement) of the first housing portion relative to the second housing portion during use of the attachment, including movement of the first housing portion toward and away from the faucet (including movement that results in the first housing portion being inclined relative to the vertical), while remaining mechanically coupled to the second housing portion. The mechanical coupling is provided by the connector portion described herein, which in various embodiments may be formed as an arm (as in the drawings herein), linkage, hinge structure, joint, track-guided member, or an integral extension of one of the housing portions, such that the functional relationship between the first housing portion and the second housing portion is maintained during movement in the second plane.

In each such embodiment, the mechanical coupling constrains relative motion between the first housing portion and the second housing portion while permitting the selective rotation in the second plane that determines whether the projection of the first housing portion is operatively positioned to limit lever rotation in the first plane.

A projection disposed on an interior surface of the first housing portion is configured to limit rotational movement of the lever in the first plane by physical interference.

A locking pin disposed within the second housing portion and movable between a locked position in which the first housing portion is prevented from rotating so as to move toward the faucet, and an unlocked position in which the first housing portion is free to rotate so as to move toward the faucet in the second plane. A magnetic key external to the second housing portion or an actuator integrally formed with the second housing portion—is configured to move the locking pin from the locked position to the unlocked position, for example by magnetically attracting the locking pin (in the event of use of the magnetic key) or for example by pushing a button on an outer surface of the second housing portion.

The attachment is a retrofit device configured for installation on an existing faucet without removal of faucet components and without requiring modification of the faucet. For example, in some implementations, the attachment is configured to attach to a bathtub faucet or other faucet having a single lever control.

The principles and operation of A Rotatable Attachment for Bathtub Faucet Safety may be better understood with reference to the drawings and the accompanying description.

Figure 2:
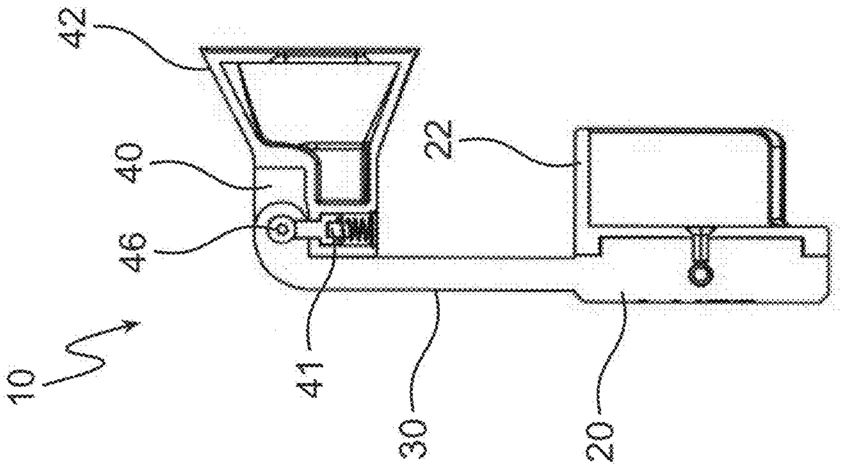
FIG. 2 is a side view of the child safety faucet attachment alone shown in FIG. 1 in the closed position, in accordance with one embodiment.
Figure 1:
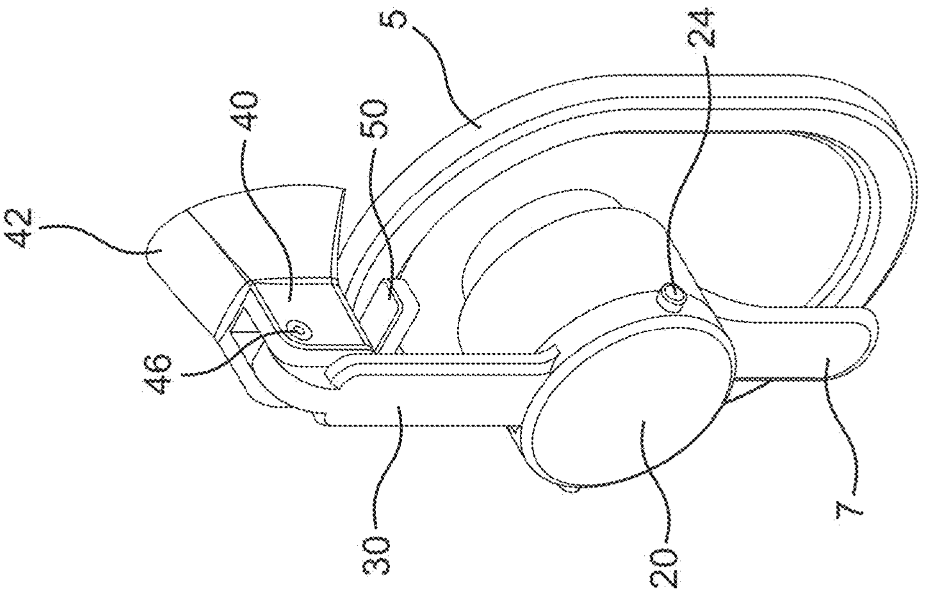
FIG. 1 is a perspective view of a child safety attachment in a closed position on a bathtub faucet, in accordance with one embodiment.

As seen from FIG. 1 and FIG. 2, FIG. 1 is a perspective view of one embodiment of a child safety attachment 10 (FIG. 2) in a closed position over a bathtub faucet 5 that includes a lever 7. As shown in FIG. 1, attachment 10 configured to be removably mounted over at least part of a faucet control lever 7 of a faucet infrastructure 5 (and in some embodiments also over at least part of a central portion (not visible in FIG. 1 because the attachment covers it) of the faucet infrastructure 5 to which the lever 7 is integrally attached).

Attachment 10 comprises a generally circular first housing portion 20 configured to surround at least part of a lever 7 (and in some implementation also over at least part of the central portion of the faucet 5) while providing a clearance that permits partial rotation of the lever 7 in a first plane. This surrounding of at least a part of the lever 7 of the faucet 5 is implemented in a child user mode in which the child's parents do not want the child to be able to rotate lever 7 of the faucet 5 completely freely in either direction, but rather want to limit rotation of the lever 7 in the direction of hot, and in some embodiments want to limit the rotation of lever 7 in both the clockwise and counterclockwise directions, for example so as to be neither too hot nor too cold.

Figure 4:
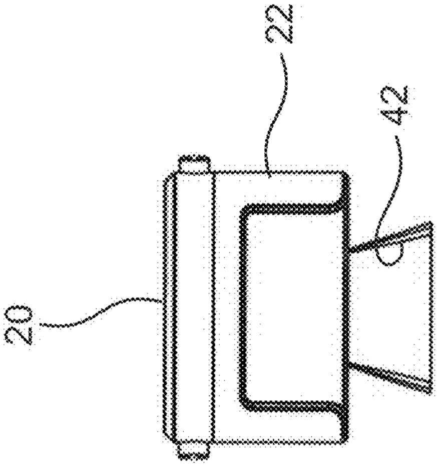
FIG. 4 is a bottom end view of the child safety attachment of FIG. 2, in accordance with one embodiment.

In some versions, as seen in FIG. 2 and FIG. 4, projection 22 is formed as a circular flange 22 that is disposed on an interior perimeter of first housing portion 20. Projection 22 may be fixed in a default position. However, for use of attachment 10 by adults in an adult mode, projection 22 can be moved when released by an actuator 24 (FIG. 1, FIG. 3, FIG. 11) situated on the first housing portion 20. This movement of projection 22 can then serve to alter the permitted range of rotation of lever 7. For example, in the default position for the child, the gap (see FIG. 10) in the projection 22 allows a limited degree of movement in a direction corresponding to hotter water and a limited degree of movement in a direction corresponding to colder water.

In one non-limiting embodiment, different indexed positions of the projection 22 correspond to different ranges of lever rotation which, depending on the faucet configuration, may result in outlet water temperatures such as about 20° C. to about 38° C. for a child-use setting, and selectable adult-use ranges such as about 22° C. to about 40° C., about 24° C. to about 42° C., about 26° C. to about 44° C., or about 28° C. to about 46° C.

The first housing portion 20 (together with the connector portion 30) is rotatable relative to the second housing portion 40 in a second plane during use of the attachment 10.

As can be understood from FIG. 2, projection 22 of first housing portion 20 may be oriented generally parallel to the second plane and intersects the first plane to define a rotation-limiting surface. In general, the projection 22 need not be planar and may be curved, arcuate, or segmented. The curved projection 22 (for example flange) may extend along only a portion of a perimeter of the first housing portion 20 to selectively block lever rotation.

The projection 22 may be configured to attach to faucet infrastructure to selectively surround at least part of the lever and in some versions also at least part of the central portion of the faucet, without requiring mechanical fasteners.

Actuators 24 are mechanically connected by springs to linear elements that block rotation of projection (for example flange 22) relative to a remainder of first housing portion 20. As seen from FIG. 11, when actuators 24 sticking out of first housing portion 20 are pressed inwardly by an adult, the linear elements are also pressed inwardly and the flange 22 can then be rotated by the adult so that the cutout portion of the flange 22 moves for example clockwise (or counterclockwise). A rotational movement of the projection 22 as set by an adult user generates a new permitted range of rotational motion of the lever 7 so as to permit the adult user to adjust the water temperature by select any one of multiple ranges of hot-water and cold-water mixing positions.

Figure 11:
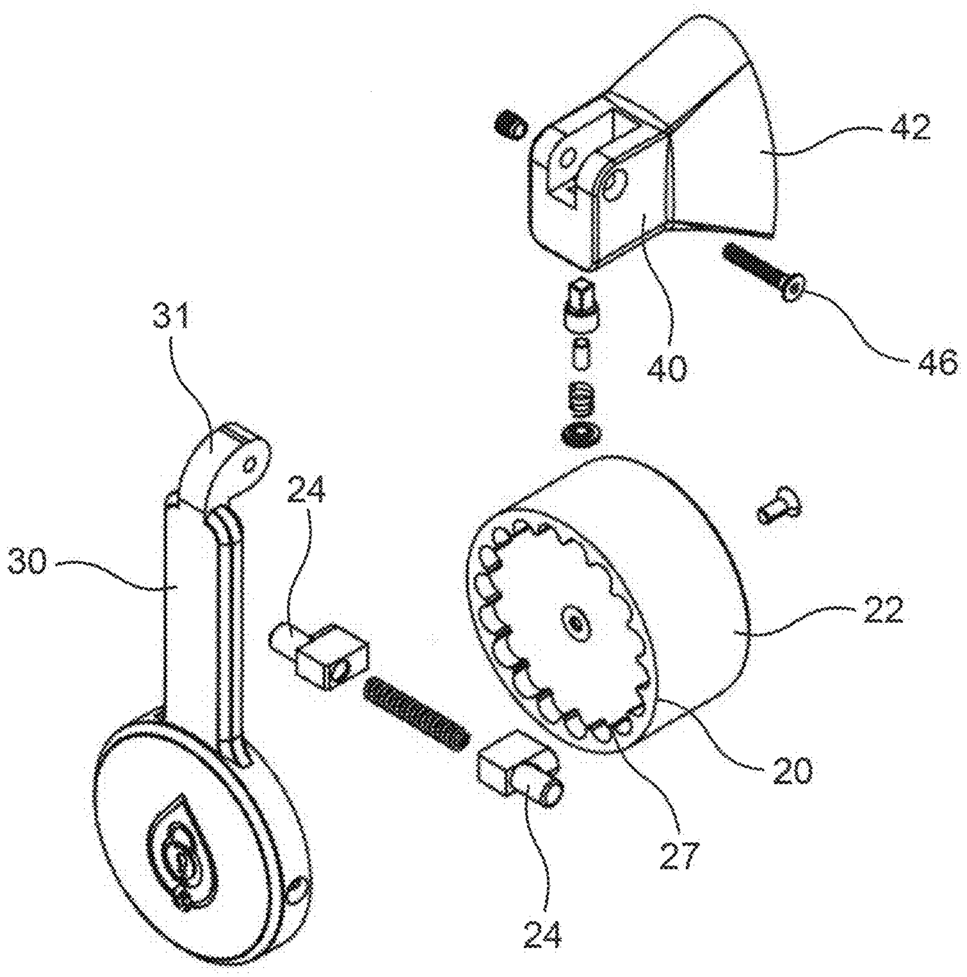
FIG. 11 is an exploded perspective of the child safety faucet attachment relative to a closed position of the attachment, in accordance with one embodiment.
Figure 12:
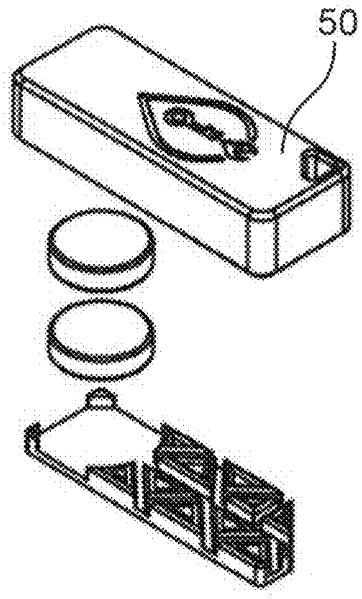
FIG. 12 is an exploded perspective view of the magnetic key for use in locking and releasing the child safety faucet attachment in the open position, in accordance with one embodiment.
Figure 13:
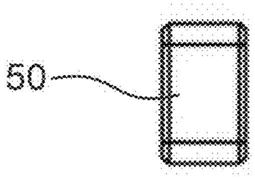
FIG. 13 is a side view of the magnetic key, in accordance with one embodiment.
Figure 14:
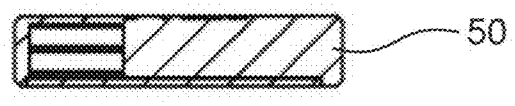
FIG. 14 is a sectional view of the magnetic key taken along line F-F of FIG. 15, in accordance with one embodiment.
Figure 15:
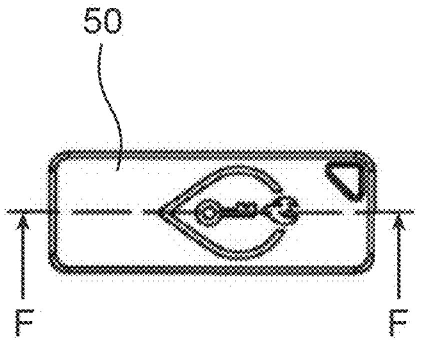
FIG. 15 is a top view of the magnetic key of FIG. 12, in accordance with one embodiment.

In order to allow the adult user to select one of many possible lever positions corresponding to different hot-cold mixing ratios, as seen from FIG. 11, in some versions, the projection 22 (generally circular portion) of the first housing portion 20 may be connected to a biasing and indexing mechanism 27 that may include one or more springs or ratchets 27. The projection 22 may be adjustable to vary a permitted rotational range in the first plane between at least two distinct user-selectable limits.

As seen from FIGS. 1-8, FIG. 10 and FIG. 11, attachment 10 further includes a connector portion 30 extending from the first housing portion 20. Connector portion 30 links first housing portion 20 with second housing portion 40, as seen in FIGS. 1-3, 5-8, 10-11. In some embodiments, as can be seen, when first housing portion rotates, connector portion 30 rotates with it. Connector portion 30 may be elongated.

As best seen from FIG. 2, FIG. 5, FIG. 6 and FIG. 11, the second housing portion 40 is coupled to the connector portion 30. One end 42 of the second housing portion 40, typically although not necessarily, the end having the widest diameter, is configured to affixedly attach to a wall of the bathroom (or other room) in which the bathtub faucet 5 (or other faucet) is situated. This attachment may be accomplished with strong adhesive or by another suitable attachment means.

The closed position of the attachment 10 shown in FIG. 1, FIG. 2, FIG. 3, FIG. 4 and FIG. 5 is reached after the first housing portion 20 has been rotated downward somewhat more than 180 degrees (as depicted in the fully open position of attachment 10 of FIG. 8 where the first housing portion 20 is leaning somewhat at an incline toward the wall that the second housing portion 40 is attached to) toward the faucet 5 so as to fit onto at least a portion of the faucet 5 (typically including the central portion or at least a portion of the central portion of the faucet 5 which central portion is not visible and including a portion of the faucet lever 7) in a manner that still allows the user to contact and operate faucet lever 7.

During use of the attachment 10, in particular to place attachment 10 in position to function during a child use mode, the first housing portion 20 and connector portion 30 are rotated (from the open position of attachment 10 seen in FIGS. 6-10) relative to the second housing portion 40 in the second plane.

Figure 8:
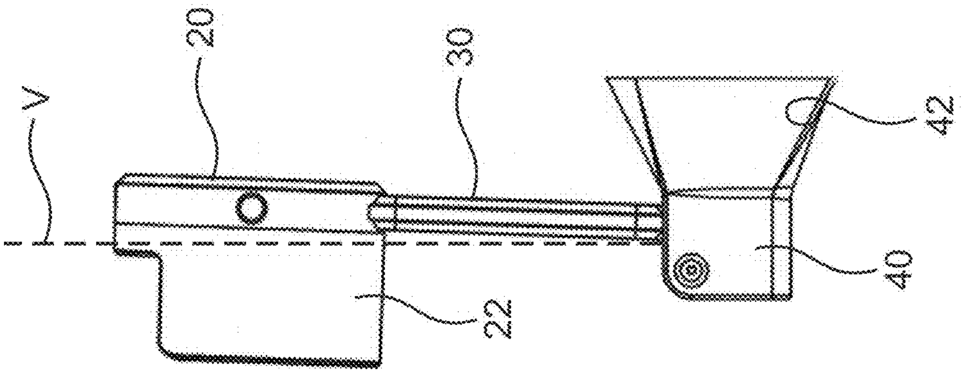
FIG. 8 is a side view of the child safety faucet attachment of FIG. 7 in the open position and leaning at an incline toward the wall that the second housing portion is attached to, in accordance with one embodiment.
Figure 9:
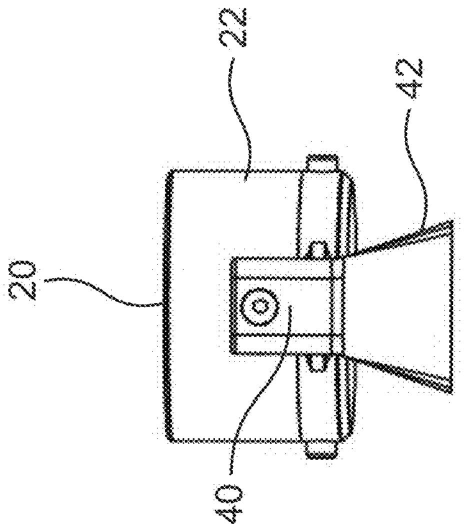
FIG. 9 is a top view of the child safety faucet attachment of FIG. 7, in accordance with one embodiment.

Initially, as seen from the open position of attachment 10 seen in FIG. 8 (which position will have been obtained as a result of the placement of magnetic key 50 under the second housing portion 40 facing locking pin 41 when attachment 10 was in the closed position), the first housing portion 20 and the connector portion 30 are leaning, at a small incline (or more) from the vertical line V (FIG. 8), toward the wall (or other external infrastructure) that the end 42 of second housing portion 40 is attached to. In addition, as a result of the friction produced by screw 46 shown in FIG. 11 (whose tightness can be adjusted), there is frictional resistance to rotation of the first housing portion 20 relative to the second housing portion 40. Accordingly, in some embodiments, first housing portion 20 will not fall from the open position to a closed position of the attachment or even to a position adjacent the faucet 5 but will require manual effort by the adult user to overcome the resistance generated by the frictional forces produced by the screw 46. It is noted that the child user will not encounter the attachment 10 in the open position at all but rather will encounter attachment 10 in the closed position shown in FIG. 1, FIG. 2, FIG. 3.

Figure 6:
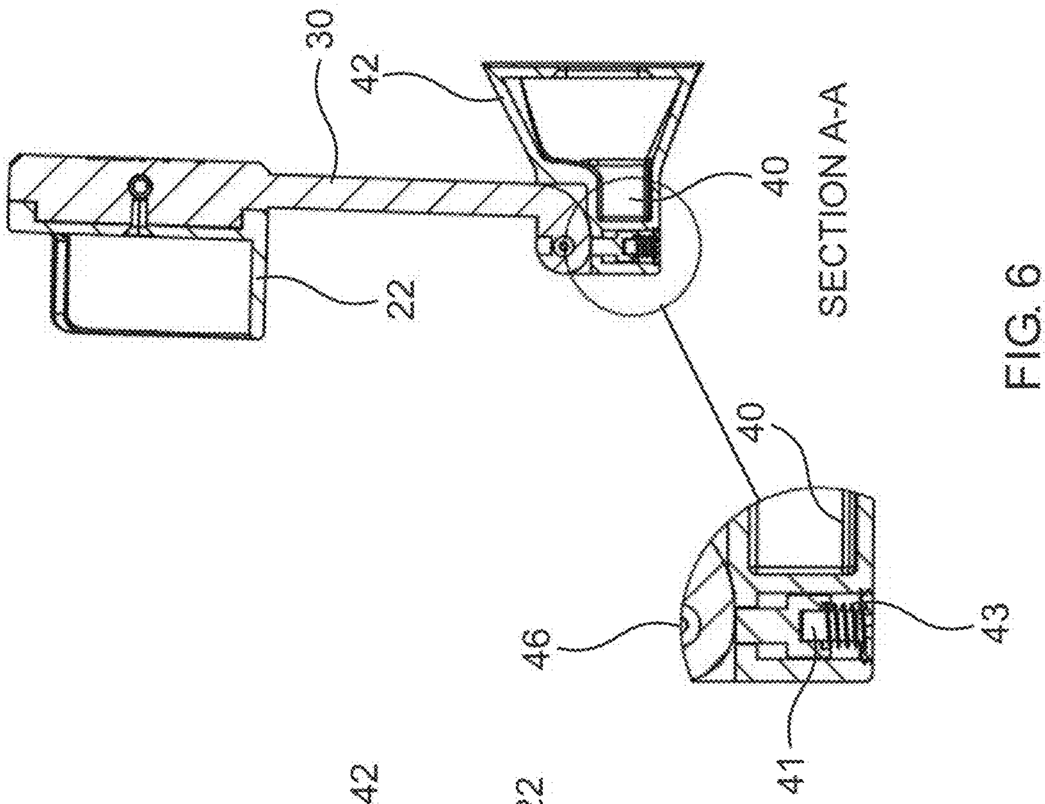
FIG. 6 is a sectional view taken along line A-A of FIG. 7, in accordance with one embodiment.
Figure 5:
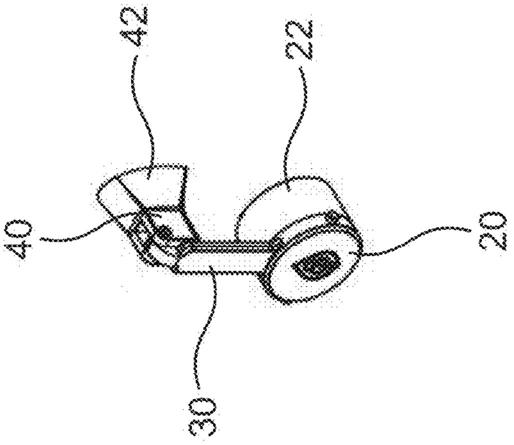
FIG. 5 is a perspective view of the child safety faucet attachment of FIG. 2, in accordance with one embodiment.
Figure 7:
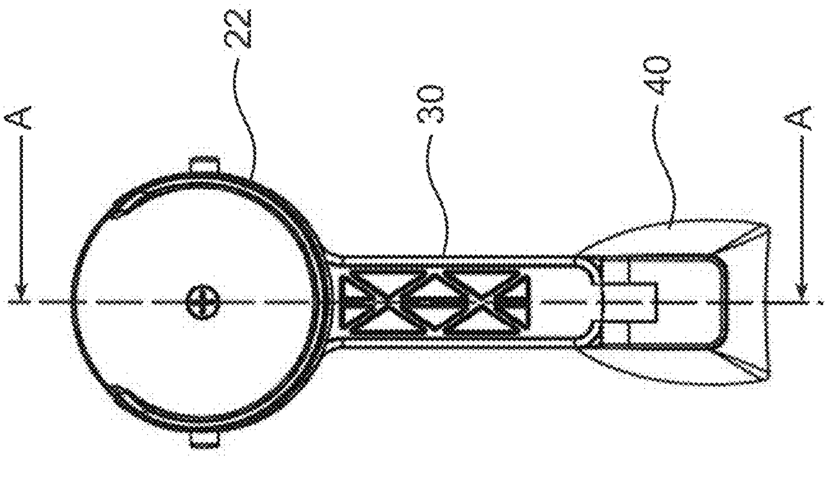
FIG. 7 is a front view of the child safety faucet attachment in the open position, in accordance with one embodiment.
Figure 10:
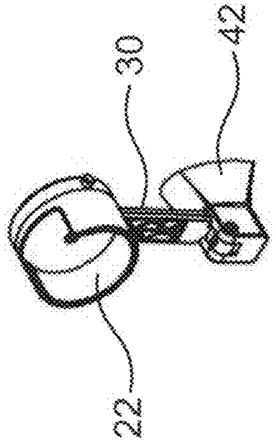
FIG. 10 is a perspective view of the child safety faucet attachment in the open position of FIG. 8, in accordance with one embodiment.

As seen from FIG. 2, FIG. 4, FIG. 5, FIG. 6, FIG. 7, FIG. 8, FIG. 9, FIG. 10 and FIG. 11, first housing portion 20 has a projection 22 disposed on an interior surface of the first housing portion 20. The projection 22 may comprise a curved flange that extends deep enough to accommodate central projections extending outwardly from the central portion of faucet 5. The projection 22 is configured to limit rotational movement of the lever 7 in the first plane by physical interference. As seen in FIG. 2, FIG. 7 and FIG. 10, the projection 22 does not occupy the full 360 degrees around the perimeter of the first housing portion 20 but rather has a cutout (a gap) so that it does not obstruct lever 7 of faucet 5, which extends outward. Typically although not necessarily, lever 7 in its position of not being too hot or too cold is facing downward, although this is not a limitation and it could face upward instead. The size of the cutout may vary and may in some implementations encompass from about 10 degrees of rotation to about 90 degrees of rotation, although these values are not a limitation. It is noted that in FIG. 11 this cutout or gap is not visible because the first housing portion 20, including projection 22, has been rotated so that the cutout or gap is out of view in order to make more of the ratchet 27 mechanism visible.

As seen from FIG. 6, especially the enlarged portion thereof, attachment 10 may also include a locking pin 41 disposed within the second housing portion 40. The locking pin 41 is configured to be movable between the locked position in which the locking pin engages the first housing portion so as to prevent the first housing portion from rotating and an unlocked position in which the locking pin does not engage the first housing portion and the first housing is free to rotate. Locking pin 41 is thus movable between a locked position in which the first housing portion 20 is prevented from rotating relative to the second housing portion 40 so as to move toward the faucet 5, and an unlocked position in which the first housing portion 20 (and together with the connector portion 30) is free to rotate relative to the second housing portion 40 so as to move toward the faucet 5 (and in particular so as to surround at least a portion of lever 7 of faucet 5 (and in some implementations so as to surround at least a part of the central portion (not shown because it is covered) of the faucet 5. This rotation occurs in the second plane.

The unlocked position of locking pin 41 may allow the first housing portion 20 together with connector portion 30 to rotate from the open position shown in FIGS. 6-10 to the closed position of attachment 10 shown in FIGS. 1-5 in which first housing portion 20 surrounds at least part of the faucet lever 7 (and typically all or part of the central portion of the faucet to which the lever 7 is integrally attached), after which the locking pin 41 is biased to return to the locked position to prevent subsequent rotation of the first housing portion 20 relative to the second housing portion 40.

In some embodiments, the projection 22 is formed as a circular flange. In some implementations, projection 22 is fixed in a default position and may be movable when released by an actuator 24 (FIG. 1, FIG. 3) situated on the first housing portion 20 for use in an adult user mode to enlarge a permitted range of lever 7 rotation.

Attachment 10 may also include a mechanism for moving the locking pin 41 that locks the first housing portion 20 and its connected connector portion 30. One implementation of this mechanism is a magnetic key 50, as shown in FIG. 12, FIG. 13, FIG. 14, FIG. 15. Magnetic key 50 may for example be external to or not integrally attached to the rest of the attachment 10.

As a result, in some embodiments, movement of the locking pin 41 by the magnetic key 50 selectively enables rotation of the first housing portion 20 in the second plane, such that rotation of the first housing portion 20 determines whether the projection 22 of the first housing portion 20 is operatively engaged to limit lever rotation in the first plane.

In the locked position of locking pin 41, the end 31 (FIG. 11) of connector portion 30 fits into an opening in second housing portion 40, as can be seen from FIG. 11. In that position, the locking pin 41 blocks escape of end 31, thereby thwarting the free rotation of first housing portion 20 together with connector portion 30. Accordingly, in the locked position, the locking pin 41 prevents rotation of the first housing portion 20 in the second plane, such that the first housing portion 20 remains engaged with the faucet 5.

In use, one places the magnetic key 50 opposite the locking pin 41 on an external surface of second housing portion 40 in order to cause locking pin 41 to move, for example linearly, toward the magnetic key 50. For example, in the enlarged portion of FIG. 6, the magnetic key 50 would be placed below spring 43 and pin 41 and external to second housing portion 40, such that an outer surface of the magnetic key 50 is flush against the outer surface of second housing portion 40.

In use, placement of magnetic key 50 flush against the outer surface of second housing portion 40 draws locking pin 41 away from its original position (the locked position of locking pin 41) to its unlocking position, thereby making possible rotation of first housing portion 20 to implement the closed position of attachment 10.

In use, the attachment 10 is maintained in its closed position for children's use. When an adult wishes to use the faucet 5 for themselves, the adult applies the magnetic key 50 and lifts the first housing portion 20 and connector portion 30 up to the open position of attachment 10, as in FIGS. 6-10 . . . . After the locking pin 41 is released by magnetic key 50 and the first housing portion 20 and connector portion 30 start to rotate upward, the magnetic key may be removed. In the closed position shown in FIGS. 1-5, the locking pin 41 is in a groove or recess in second housing portion 40 so as to block any tampering by a child In some implementations, the first housing portion 20 together with connector portion 30 rotates through about 175 to about 200 degrees (for example about 180 to about 185 degrees or about 182 to about 190 degrees or about 182 to about 195 degrees) since in the open position of the attachment 10 shown in FIGS. 6-10 the first housing portion 20 is inclined slightly toward the wall (or other external infrastructure) that the second housing portion 40 attaches to. In FIG. 8, first housing portion 20 and connector portion 30 may be about 2 to 5 degrees off the vertical, V, without touching the wall.

Figure 16B:
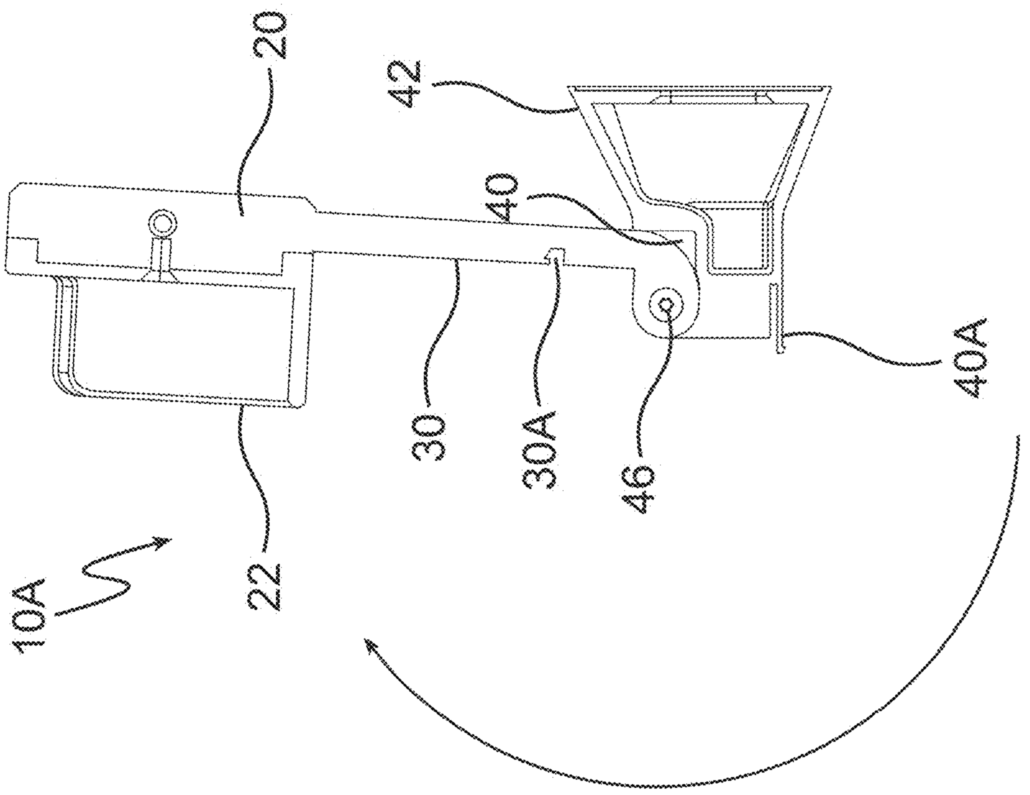
FIG. 16B is a side view of FIG. 16A in an open position of the attachment of FIG. 16A, in accordance with one embodiment.
Figure 16A:
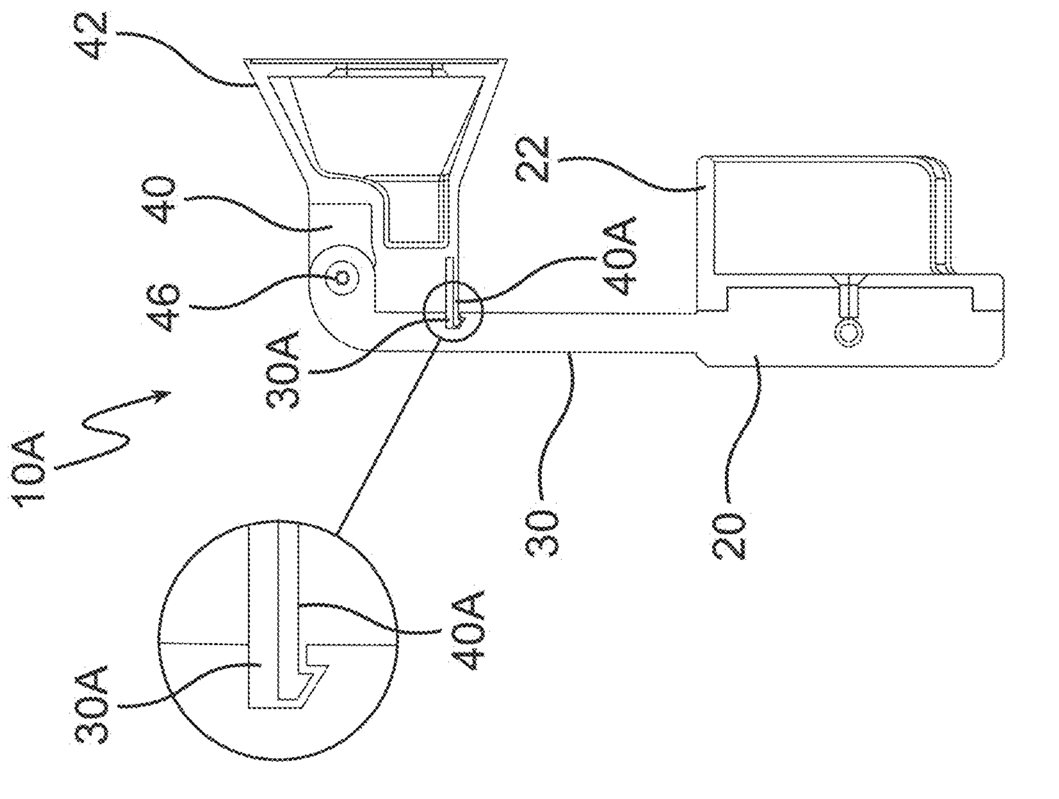
FIG. 16A is a side view of another implementation of the child safety faucet attachment, in accordance with one embodiment.

In another embodiment of attachment 10A depicted in FIG. 16A and FIG. 16B, instead of a magnetic key 50 that moves the locking pin from a locked position to an unlocked position, there is no locking pin 41 (or associated spring) that locks attachment 10. Rather, attachment 10 is locked by a projection of an outer surface such as a tongue 40A comprising a flexible outer surface 40A of second housing portion 40 so that when the first housing portion 20 and connector portion (arm) 30 are rotated so as to engage the faucet lever 7, the tongue extends outward into a recess 30A or cutout 30A at the upper portion of connector portion 30 (the upper portion that includes the end that attaches to the second housing portion 40) and is caught or stuck in that position in the recess 30A. This constitutes the locked position in which the attachment 10 is closed.

In order to release the lock, the actuator 40A, accessible to a user on the outer surface of second housing portion 40 is pressed and flexed (in a direction away from the first housing portion 20). This actuator 40A may be the tongue or other flexible outer surface 40A of the second housing portion 40 that is bendable. By bending the actuator 40A upward, it is able to escape being locked in groove or recess 30A of connector portion 30. In one version, the flexible outer surface 40A is at a free end (for example free on three of its four sides of a shape that is substantially rectangular) of the outer surface of second housing portion 40.

In this embodiment, attachment 10A is an attachment configured to be removably mounted over a faucet control lever 7 and a central portion of a faucet 5 to which the lever 7 is integrally attached, comprising:

- a generally circular first housing portion 20 configured to surround at least part of the central portion of the faucet 7 while providing a clearance that permits partial rotation of the lever 7 in a first plane in a child user mode;
- a connector portion 30 extending from the first housing portion 20;
- a second housing portion 40 coupled to the connector portion 30 and configured to be affixedly attached to external infrastructure, the first housing portion 20 and the connector portion 30 being rotatable together relative to the second housing portion 40 in a second plane during use of the attachment;
  - a projection 22 disposed on an interior surface of the first housing portion 20 and configured to limit rotational movement of the lever 7 in the first plane by physical interference;
- a locking tongue 40A formed on a flexible outer surface of the second housing portion 40 and selectively deflectable between a flexed condition, in which the first housing portion 20 is free to rotate relative to the second housing portion 40 in the second plane, and a straight condition, in which the first housing portion 20 is prevented from rotating relative to the second housing portion 40 in the second plane, the locking tongue 40A is securely engaged in a recess 30A of the connector portion 30,
- wherein deflection of the locking tongue 40A selectively enables rotation of the first housing portion in the second plane, such that rotation of the first housing portion 20 determines whether the projection 22 of the first housing portion 20 is operatively engaged to limit rotation of the lever 7 in the first plane. The force required to disengage the locking tongue 40A is selected such that it is difficult for a child to apply. The actuator 40A need not be in the form of a tongue but can be other shaped configured to engage a suitably shaped recess 30A in connector portion 30.

In some implementations, the actuator is (A) a magnetic key external to the second housing portion 40, (B) a button on an outer surface of second housing portion 40 or (C) a flexible outer surface of the second housing portion 40 configured to be pressed and thereby bent in a direction of the locking pin 41. Other implementations of the locking mechanism are also possible.

In some embodiments, the structure of the attachment 10 defines three different operations modes of lever rotation. In general, the locking pin 41 controls rotation of the first housing portion 20 in the second plane, not rotation of the lever 7 itself in the first plane. The first mode is an open position of the attachment 10 when the first housing portion 20 is not engaged with the faucet 5 and may for example be in a position above the second housing portion 40 (positioned away from the faucet). In this mode the lever 7 can be freely rotated (for example by an adult) through a maximum range of motion because the first housing portion 20 is not engaged with the faucet 5 at all and has not been and cannot be placed over a portion of the lever 7 of the faucet 5. This is one mode that the parents may choose to have the attachment 10 in.

In a second mode, a variant of the closed position of attachment 10, but where adults use the faucet 5 with some restrictions on movement of the lever 7 so that the attachment 10 can be most easily shifted to child mode in an instant. In this mode, the lever 7 can be rotated but only through a manually pre-set range of motion defined by an indexed adjustment of the projection 22 for example using an indexing mechanism inside the first housing portion 20 after the first housing portion 20 has been rotated into engagement with the faucet 5 while the locking pin 41 was unlocked and the locking pin 41 was subsequently locked. Even though this is the closed position of the attachment 10, release of the projection 22 on the first housing portion 20 by the actuator 24 permits the projection 22 to rotate within the pre-set range. The range of water temperatures that the adult will have access to depends on what position the adult adjusts the projection 22 to.

In a third mode, when attachment 10 is in its closed position (FIGS. 1-5) and the projection 22 has not been released or repositioned into a pre-set range of motion that differs from the default position, the lever 7 is rotatable only to a limited degree since the first housing portion 20 has been rotated so as to surround the at least part of the lever 7 of the faucet. Furthermore, in this mode, the projection 22 has not been released by pressing actuators 24. This is for use by children.

Likewise, the structure of the attachment 10A defines three different operations modes of lever rotation, with the difference being that in the second mode the locking condition is defined differently by a structure other than a locking pin, since attachment 10A does not include a locking pin 41.

Figure 17:
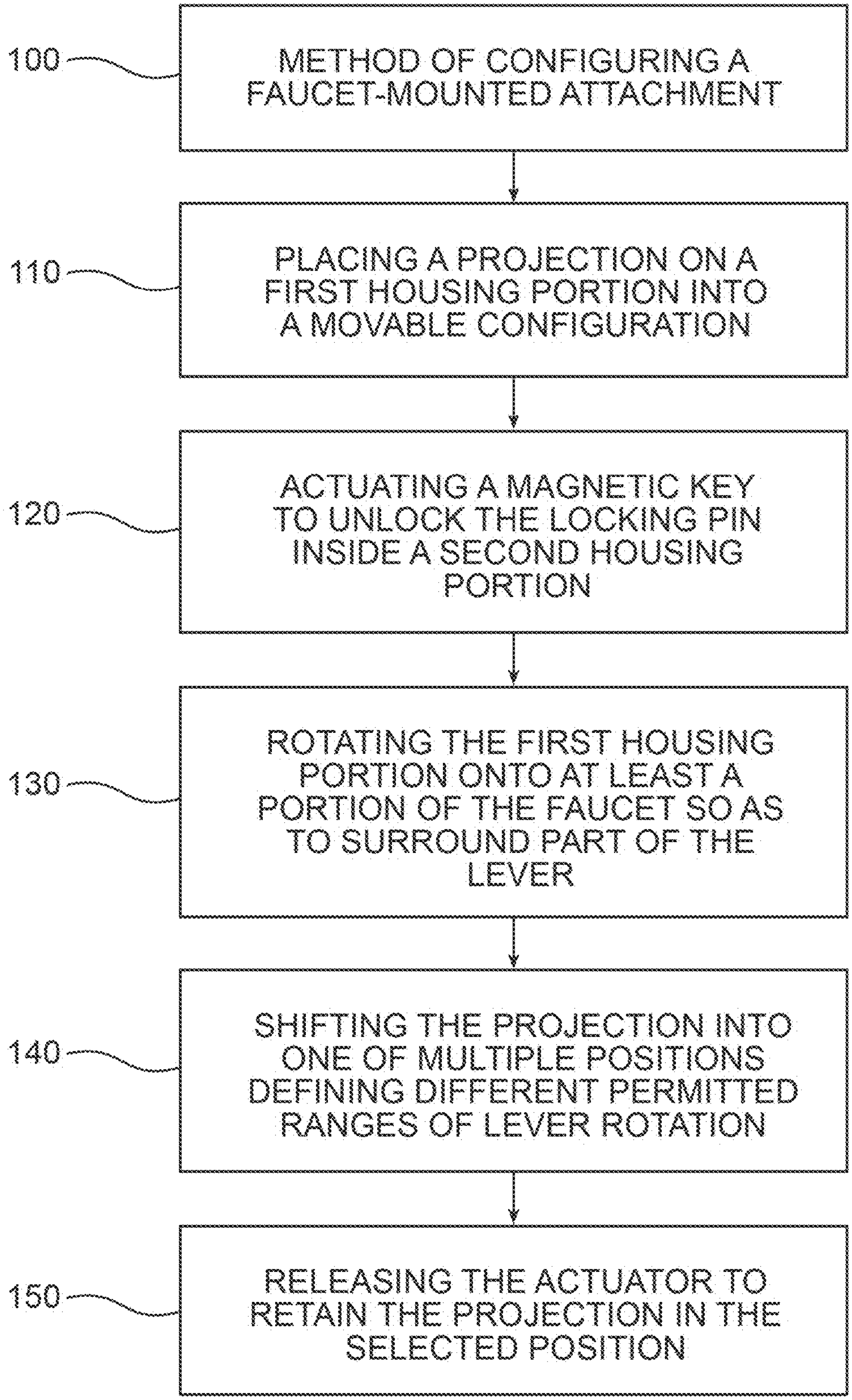
FIG. 17 is a flow chart showing a method, in accordance with one embodiment.

As shown in the flow chart of FIG. 17, another embodiment is a method 100 of Method step 110 comprises placing a projection that is on an interior surface of a first housing portion into a movable configuration relative to the first housing portion using an actuator on the first housing portion. Method step 120 comprises actuating a magnetic key to move a locking pin within a second housing portion from a locked position to an unlocked position. In a method step 130, while the locking pin is in the unlocked position, the method step 130 comprises rotating a first housing portion toward a faucet lever, and onto at least part of the faucet lever. Method step 140 comprises shifting the projection into one of multiple selectable positions that define different permitted ranges of lever rotation in a first plane. Method step 150 comprises releasing the actuator 24 to retain the projection in the selected position.

The term "about" as used herein means plus or minus 5%.

While the invention has been described with respect to a limited number of embodiments, it will be appreciated that many variations, modifications and other applications of the invention may be made. Therefore, the claimed invention, as recited in the claims that follow, is not limited to the embodiments described herein.

What is claimed is:

1. An attachment configured to be removably mounted over at least part of a faucet control lever and at least part of a central portion of a faucet to which the lever is integrally attached, comprising:

a generally circular first housing portion configured to surround at least part of the central portion of the faucet while providing a clearance that permits partial rotation of the lever in a first plane in a child user mode;

a connector portion extending from the first housing portion;

a second housing portion coupled to the connector portion and configured to be affixedly attached to external infrastructure, the first housing portion and the connector portion being rotatable together relative to the second housing portion in a second plane during use of the attachment;

a projection disposed on an interior surface of the first housing portion and configured to limit rotational movement of the lever in the first plane by physical interference;

a locking pin disposed within the second housing portion and movable between an unlocked position in which the first housing portion is free to rotate relative to the second housing portion in the second plane, and a locked position in which the first housing portion engages the faucet and is prevented from rotating relative to the second housing portion in the second plane; and a magnetic key configured to magnetically interact with the locking pin to move the locking pin from the locked position to the unlocked position without physical contact between the magnetic key and the locking pin, wherein movement of the locking pin by the magnetic key selectively enables rotation of the first housing portion in the second plane, such that rotation of the first housing portion determines whether the projection of the first housing portion is operatively engaged to limit lever rotation in the first plane, wherein the projection is fixed in a default position and is movable when released by an actuator situated on the first housing portion in an adult user mode to enlarge a permitted range of lever rotation.

2. The attachment of claim 1, wherein a rotational movement of the projection as set by an adult user generates a new range of rotational movement of the lever so as to permit the adult user to select one of multiple ranges of hot-water and cold-water mixing positions.

3. The attachment of claim 1, wherein the magnetic key is positionable on an outer surface of the second housing portion so as to magnetically interact with the locking pin.

4. The attachment of claim 1, wherein the projection is a curved flange extending inwardly toward the lever.

5. The attachment of claim 4, wherein the projection is oriented generally parallel to the second plane and intersects the first plane to define a rotation-limiting surface.

6. The attachment of claim 4, wherein the curved flange extends along only a portion of a perimeter of the first housing portion to selectively block lever rotation.

7. The attachment of claim 1, wherein the generally circular part of the first housing portion is configured to surround at least part of the central portion of the faucet without requiring mechanical fasteners.

8. The attachment of claim 7, wherein the generally circular part of the first housing portion is connected to a biasing and indexing mechanism including one or more springs or ratchets.

9. The attachment of claim 1, wherein the projection is disposed on an interior perimeter of the first housing portion.

10. The attachment of claim 1, wherein the projection is adjustable to vary a permitted rotational range in the first plane between at least two distinct user-selectable limits.

11. The attachment of claim 1, wherein the attachment is a retrofit device configured for installation on an existing faucet without removal of faucet components and without requiring modification of the faucet.

12. The attachment of claim 1, wherein the attachment is configured to attach to a bathtub faucet or other faucet having a single lever control.

13. The attachment of claim 1, wherein the locking pin is inside the second housing portion and actuated by the magnetic key on an outer surface of the second housing portion.

14. The attachment of claim 1, wherein the locking pin is movable by use of the magnetic key from the locked position to the unlocked position in which the first housing portion is above the second housing portion and leaning toward a wall that the second housing portion is attached to.

15. The attachment of claim 1, wherein a structure of the attachment defines three different operational modes of lever rotation:

(a) when the lever can be rotated freely through a maximum range of motion because the first housing portion is positioned above the second housing portion and has not rotated toward the faucet;

(b) when the lever can be rotated but only through a manually pre-set range of motion defined by an indexed adjustment of the projection using an indexing mechanism inside the first housing portion after the first housing portion has been rotated into engagement with the faucet while the locking pin was unlocked and the locking pin was subsequently locked, and wherein, in the closed position of the attachment, release of the projection on the first housing portion by the actuator permits the projection to rotate within the pre-set range; and (c) when the lever is rotatable to a limited degree since the locking pin is locked after the first housing portion has been rotated so as to surround the at least part of the central portion of the faucet and since the projection on the first housing portion has not been released.

16. A method of configuring a faucet-mounted attachment prior to installation on a faucet, the method comprising:

placing a projection that is on an interior surface of a first housing portion into a movable configuration relative to the first housing portion using an actuator on the first housing portion;

actuating a magnetic key to move a locking pin within a second housing portion from a locked position to an unlocked position;

while the locking pin is in the unlocked position, rotating a first housing portion into engagement with a faucet lever;

shifting the projection into one of multiple selectable positions that define different permitted ranges of lever rotation in a first plane; and releasing the actuator to retain the projection in the selected position.

17. An attachment configured to be removably mounted over at least part of a faucet control lever and at least part of a central portion of a faucet to which the lever is integrally attached, comprising:

a generally circular first housing portion configured to surround at least part of the central portion of the faucet while providing a clearance that permits partial rotation of the lever in a first plane in a child user mode;

a connector portion extending from the first housing portion;

a second housing portion coupled to the connector portion and configured to be affixedly attached to external infrastructure, the first housing portion and the connector portion being rotatable together relative to the second housing portion in a second plane during use of the attachment;

a projection disposed on an interior surface of the first housing portion and configured to limit rotational movement of the lever in the first plane by physical interference;

a locking tongue formed on a flexible outer surface of the second housing portion and selectively deflectable between a flexed condition, in which the first housing portion is free to rotate relative to the second housing portion in the second plane, and a straight condition, in which the first housing portion is prevented from rotating relative to the second housing portion in the second plane, the locking tongue is securely engaged in a recess of the connector portion, wherein deflection of the locking tongue selectively enables rotation of the first housing portion in the second plane, such that rotation of the first housing portion determines whether the projection of the first housing portion is operatively engaged to limit lever rotation in the first plane, wherein the projection is fixed in a default position and is movable when released by an actuator situated on the first housing portion in an adult user mode to enlarge a permitted range of lever rotation.

18. The attachment of claim 17, wherein a rotational movement of the projection as set by an adult user generates a new range of rotational movement of the lever so as to permit the adult user to select one of multiple ranges of hot-water and cold-water mixing positions.

19. The attachment of claim 17, wherein the projection is a curved flange extending inwardly toward the lever.

20. The attachment of claim 19, wherein the projection is oriented generally parallel to the second plane and intersects the first plane to define a rotation-limiting surface.

21. The attachment of claim 19, wherein the curved flange extends along only a portion of a perimeter of the first housing portion to selectively block lever rotation.

22. The attachment of claim 17, wherein the generally circular part of the first housing portion is configured to surround at least part of the central portion of the faucet without requiring mechanical fasteners.

23. The attachment of claim 22, wherein the generally circular part of the first housing portion is connected to a biasing and indexing mechanism including one or more springs or ratchets.

24. The attachment of claim 17, wherein the projection is disposed on an interior perimeter of the first housing portion.

25. The attachment of claim 17, wherein the projection is adjustable to vary a permitted rotational range in the first plane between at least two distinct user-selectable limits.

26. The attachment of claim 17, wherein the attachment is a retrofit device configured for installation on an existing faucet without removal of faucet components and without requiring modification of the faucet.

27. The attachment of claim 17, wherein the attachment is configured to attach to a bathtub faucet or other faucet having a single lever control.

* * * * *